May 14, 1935.  C. A. FUCHS  2,001,060
MEANS OF SECURING A SCALE STRIP TO A SCALE BAR
Filed Nov. 21, 1931
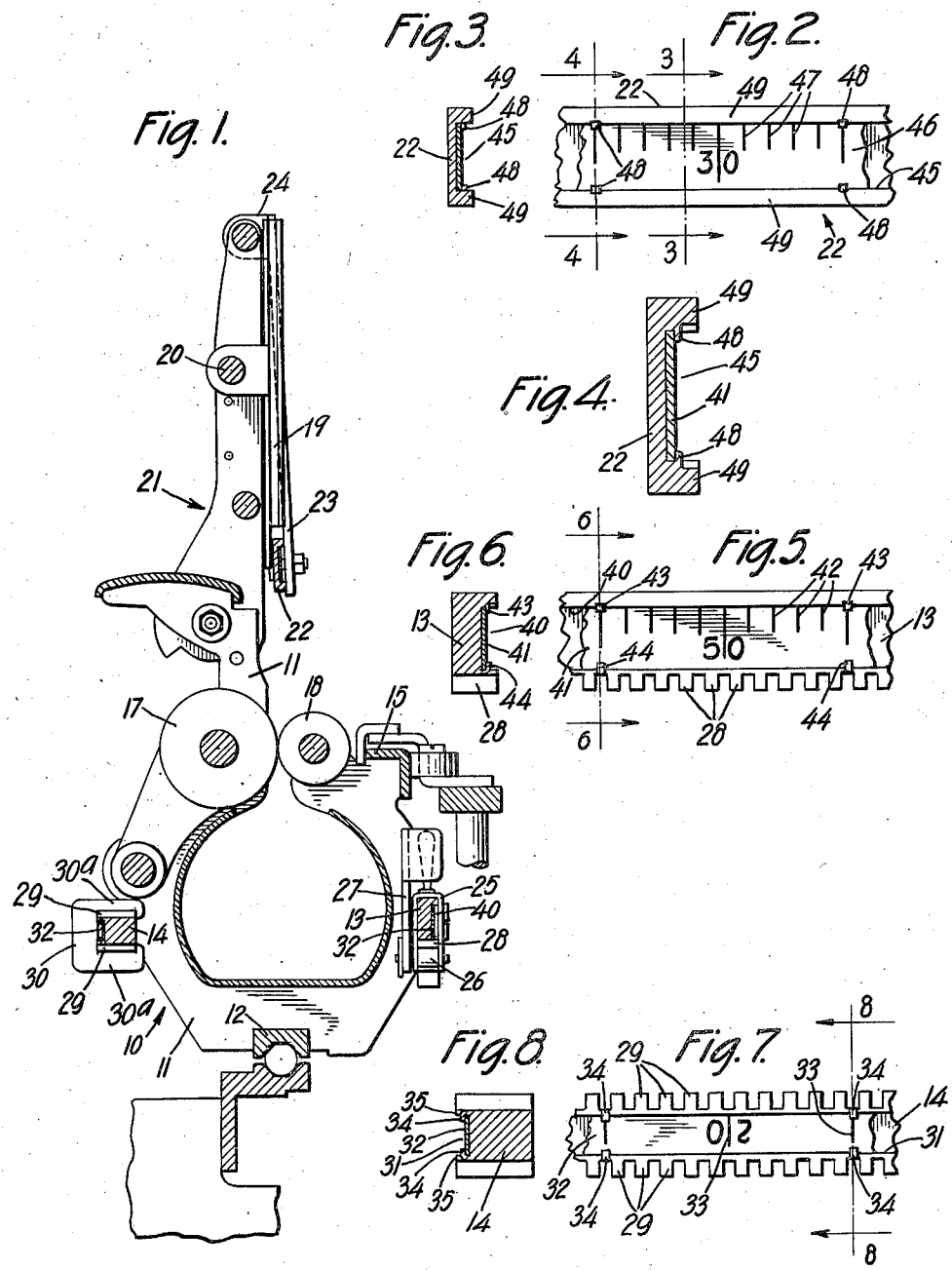
INVENTOR
Charles A. Fuchs.
BY John Waldheim
ATTORNEY Patented May 14, 1935

2,001,060

UNITED STATES PATENT OFFICE 2,001,060

MEANS OF SECURING A SCALE STRIP TO A SCALE BAR

Charles A. Fuchs, Hollis, N. Y., assignor, by mesne assignments, to Ralph C. Coxhead Corporation, New York, N. Y., a corporation of Delaware Application November 21, 1931, Serial No. 576,498

4 Claims. (Cl. 197—194)

This invention relates to improvements in typewriting machines and more particularly to means of securing a scale strip to a scale bar or a stop bar.

Heretofore scales have been inscribed directly on the bar and it has been found that these are difficult to read. Separate scales have also been provided attached to the bar by means of screws when the scale has been broad enough to permit the use of screws.

An object of the present invention is to provide a scale which may be composed of celluloid or like material, which may be white in color with black graduations thereon, and to secure the scale to a metal bar by simple means which will not obstruct the scale and which will not interfere with stops to be carried by the bar.

In carrying out the invention the scale supporting bar is provided with a shallow groove, extending lengthwise thereof, in which is located a thin scale strip. After the scale strip is placed in the groove, portions of material are pressed in from the sides of the groove to form fingers which overlap the edges of the scale strip to hold or secure it permanently in position on the bar. The fingers are formed at intervals of about one inch to prevent bulging of the scale strip.

An advantage of the present invention is that the scale strip may be applied or attached to a bar such as a tabulator stop bar where the face between the toothed sides is small or narrow, without obstructing the scale face. Another advantage is that the securing means does not interfere with the tabulator stops and the groove or recess in the bar may be very shallow.

Other features and advantages may hereinafter appear.

In the drawing which forms part of the specification:

Fig. 1 is a vertical section of the carriage of the machine, as seen from the left hand end thereof, showing the invention applied thereto;

Fig. 2 is a front view of a portion of the scale on the paper rack;

Fig. 3 is a vertical section taken on the line 3—3 of Fig. 2;

Fig. 4 is a similar view on a larger scale, the section being taken on the line 4—4 of Fig. 2;

Fig. 5 is a front view of a portion of the margin stop bar;

Fig. 6 is a sectional view taken on the line 6—6 of Fig. 5;

Fig. 7 is a rear view of the tabulator stop bar; and

Fig. 8 is a vertical section taken on the line 8—8 of Fig. 7.

The invention is herein illustrated as applied to a Varityper machine which includes a carriage 10 comprising two end pieces 11 to which are secured a track 12, a margin stop bar 13, a tabulator stop bar 14 and a guide bar 15.

A basket 16 is provided on the carriage from which a work sheet (not shown) is fed upwardly by feed rollers 17 and 18 also supported on the carriage. The work sheet passes upwardly from the feed rollers to the usual printing instrumentalities (not shown) by which it is typed upon. From the printing instrumentalities the work sheet extends into suitable paper guides 19, only one being shown, supported on a bar 20 of a frame 21 supported on the end pieces 11 of the carriage.

A scale bar 22 is supported by two arms 23 pivotally supported, by ears 24, on the frame 21 so that the scale bar may be swung to and away from the work sheet at will.

The margin stop bar 13 has supported thereon one or more margin stops like those shown in the application of Frank H. Trego, No. 437,974, March 22, 1930. The margin stop includes a frame part 25 which straddles the bar 13 and pivotally supports a pawl 26, the latter being operable by a handle 27 to actuate the pawl 26 to disengage it from the teeth 28 formed on the lower edge of the stop bar 13.

The tabulator stop bar is provided with teeth 29 on its opposite faces between which the arms 30ª of a U-shaped tabulator stop 30 may be inserted from the rear of the machine, the closed part of the stop engaging the rear of the bar 14.

The stop bar 14 of my invention is provided on its rear face, Figs. 1, 7 and 8, with a longitudinal groove or recess 31 which is quite shallow and in which there is located a thin strip 32 of celluloid or other suitable material having black scale marks 33 thereon so that they may be easily discerned, the groove 31 and the scale strip 32 being of the same dimension transversely of the bar so as to expose the entire scale face. The scale is secured to the stop bar by fingers 34 which are pressed in over the opposite edges of the scale strip 32 from the thin flanges 35 bordering the recess 31 and preferably from the material between the teeth 28 as in Fig. 7. The fingers or fastening devices 34 are formed at one inch intervals to prevent bulging of the scale strip.

It will be understood that the groove 31 forms with the slots between the teeth on the stop bar thin members which are readily pressed out to form the fingers 34, and that the fingers 34 do not protrude from the face of the stop bar and consequently do not interfere with the stop 30 in any letter space position of the stop bar.

The margin stop bar 13 is also provided with a shallow groove 40 (Figs. 1, 5 and 6), in its front face, in which is located a scale strip 41 having letter space scale marks 42 thereon, said scale being held in said groove by fingers 43 and 44 which are also pressed in from the bar material bordering the groove 40 against the scale strip to secure it to said bar.

The scale bar 22 (Figs. 1, 2, 3 and 4) is also provided with a recess 45 in which a scale strip 46, having scale marks 47, is located and which is held, or in other words, secured, in place by fingers 48 pressed in from flanges 49 at the sides of the recess 45.

From the foregoing it will be understood that the means of securing the scale plates to the margin stop bar 13, the tabulator bar 14 and the scale bar 22 are simple and economical since there are no holes to be drilled and tapped and no screws required to fasten the scale plate to its respective bar.

While certain preferred embodiments of the invention have been described, it will be understood that changes may be made without departing from the scope of the invention as defined in the appended claims.

I claim:—

1. In a typewriting machine, the combination of a rectangular stop bar, a stop thereon, teeth on one face of the stop bar to be engaged by the stop to hold it in place on the bar, the face of the bar at right angles to the toothed face having a shallow recess therein, a thin scale bearing strip in said recess, the slots between the teeth forming with the groove thin members, and fingers formed by pressing some of these thin members over the edge of the scale strip to hold the latter against displacement on said bar.

2. In a typewriting machine, the combination of a tabulator stop bar, said bar being rectangular in cross-section, a U-shaped stop thereon having a base and two arms extending therefrom, teeth on opposite faces of the bar to be engaged by the arms of the stop, a recess in the face of the bar at the base of the stop, said recess extending across said face but not quite to the teeth thus providing thin members between the teeth at each side of the recess, a scale plate in said recess, and fingers formed at intervals by pressing out some of said members over the opposite edges of the scale plate to secure the latter in place on said bar.

3. A stop bar for a typewriting machine, said bar having a shallow longitudinally extending groove therein, a scale strip in said groove, devices located at wide intervals as compared with the width of the devices lengthwise of the bar and extending into said groove from the side thereof and pressing against said strip to secure it to said bar, and a stop to embrace said bar, said devices being confined entirely within the groove so as not to interfere with the stop.

4. In a typewriting machine, the combination of a stop bar, flanges on the opposite edges of said bar to form a shallow groove therein, a thin scale plate in said groove, transverse slots on one edge of said bar to form teeth thereon, said slots extending also through one of said flanges, the slots forming with said groove thin members between said teeth, fingers formed by pressing some of the thin members out from between said teeth and over one edge of said scale plate to assist in holding the scale plate, and fingers swaged out from the other flange and extending over the opposite edge of the scale plate to further hold the scale plate.

CHARLES A. FUCHS.